(12) United States Patent
Tsujii et al.

(10) Patent No.: US 7,324,741 B2
(45) Date of Patent: *Jan. 29, 2008

(54) RECORDING APPARATUS, RECORDING METHOD, REPRODUCING APPARATUS, REPRODUCING METHOD, AND RECORD MEDIUM

(75) Inventors: Satoshi Tsujii, Tokyo (JP); Makoto Yamada, Tokyo (JP); Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 319 days.

This patent is subject to a terminal disclaimer.

(21) Appl. No.: 11/086,150

(22) Filed: Mar. 22, 2005

(65) Prior Publication Data

US 2005/0165845 A1 Jul. 28, 2005

Related U.S. Application Data

(63) Continuation of application No. 09/672,863, filed on Sep. 28, 2000, now Pat. No. 7,027,717.

(51) Int. Cl.
*H04N 7/26* (2006.01)
*H04N 5/00* (2006.01)

(52) U.S. Cl. .................................. 386/125; 386/124
(58) Field of Classification Search .................. 386/46, 386/124, 125, 45, 1, 40
See application file for complete search history.

(56) References Cited

U.S. PATENT DOCUMENTS

| 4,945,475 A | 7/1990 | Bruffey et al. |
| 5,253,053 A | 10/1993 | Chu et al. |
| 5,652,879 A | 7/1997 | Harris et al. |
| 5,852,800 A | 12/1998 | Modeste et al. |
| 6,324,334 B1 | 11/2001 | Morioka et al. |
| 6,538,969 B1 | 3/2003 | Vitkus et al. |
| 2007/0058946 A9* | 3/2007 | Kikuchi et al. ............... 386/98 |

FOREIGN PATENT DOCUMENTS

WO    WO 98 05034    2/1998

OTHER PUBLICATIONS

Walsh A E: "Programming Quicktime Multimedia to the MACS" Dr. Dobbs Journal, Redwood City, CA, US, vol. 17, No. 7, Jul. 1, 1992, pp. 76, 78-80, 102, XP000600303.

(Continued)

*Primary Examiner*—Robert Chevalier
(74) *Attorney, Agent, or Firm*—Frommer Lawrence & Haug LLP; William S. Frommer; Thomas F. Presson

(57) ABSTRACT

A recording apparatus for recoding digital data to a record medium that is removable and assigned unique medium identification information is disclosed, that comprises a converting means for converting data to be recorded into a file structure that allows a first file format and a second file format to be used, the first file format being handled by computer software and composed of a reference information storing portion and a real data storing portion, the second file format being composed of only a reference information storing portion, and a recording means for recording data having the file structure to the record medium, wherein reference file information and medium identification information of the record medium or information of which the medium identification information has been converted are recorded to at least the reference information storing portion of a file having the second file format.

1 Claim, 16 Drawing Sheets

OTHER PUBLICATIONS

J. Wang: "Somewhere in Quicktime cross-platform compatibility and multiple-movie files" 'Online! Feb. 25, 1999, XP002292973 Retrieved from the Internet: URL:www.machtech.com> 'retrieved on Aug. 18, 2004! In particular, 2nd and 3rd paragraphs of seciton "multiple-movie files for the macintosh".

Apple Computer: "Quicktime File Format" 2000, Apple Computer, Inc, XP002292974 Chapter 2, see data reference atoms pp. 82-83, in particular self-reference flag on top of p. 83.

* cited by examiner

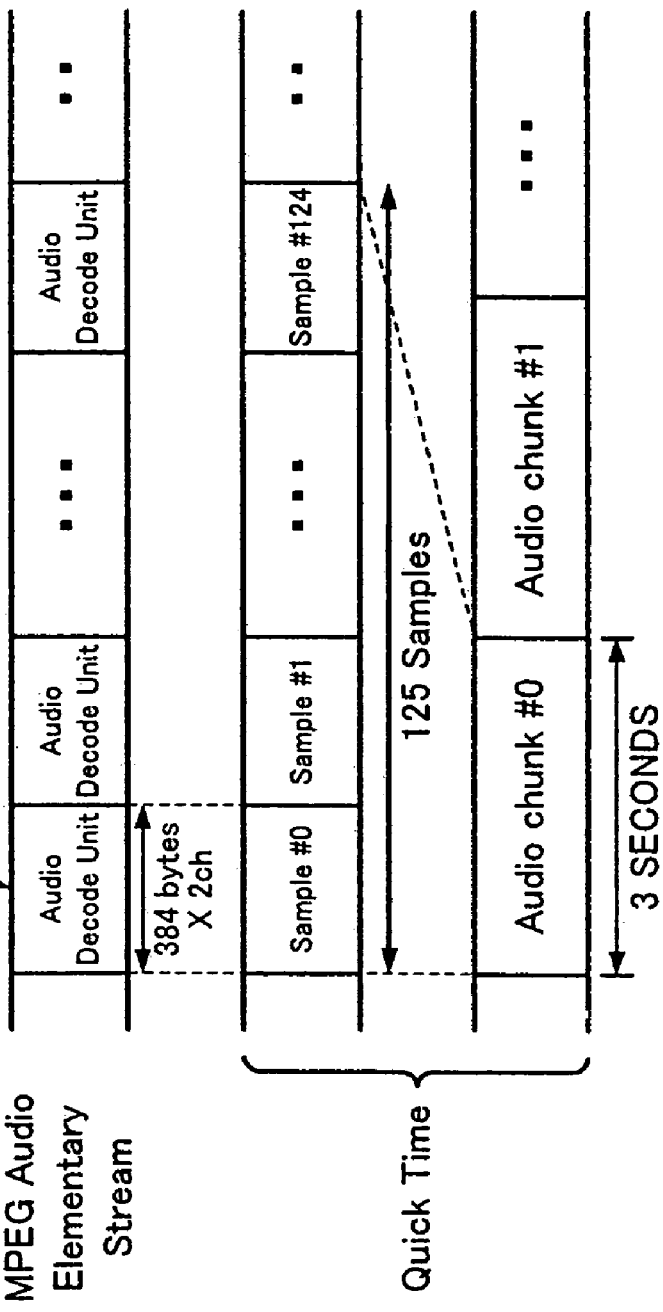

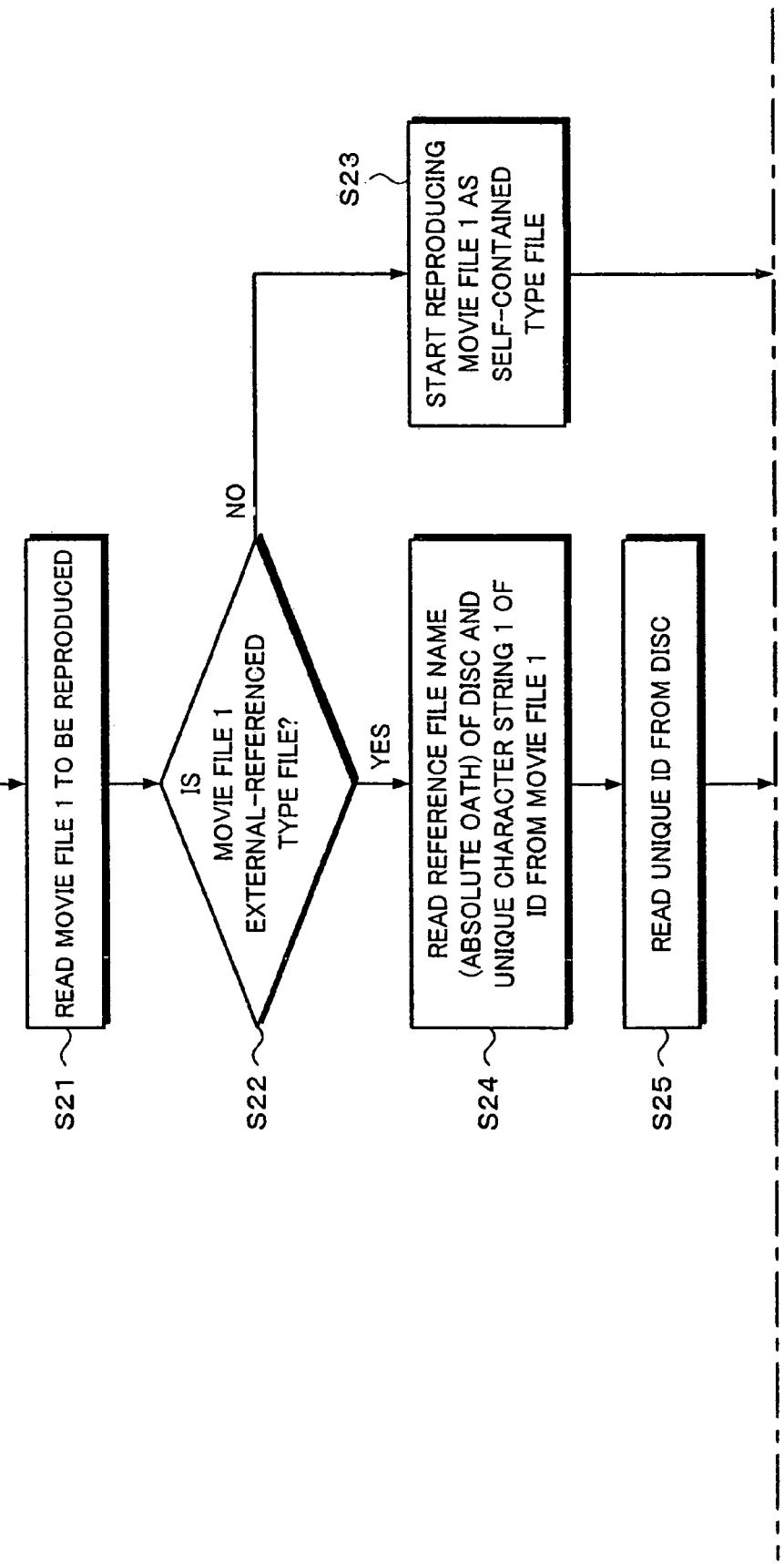

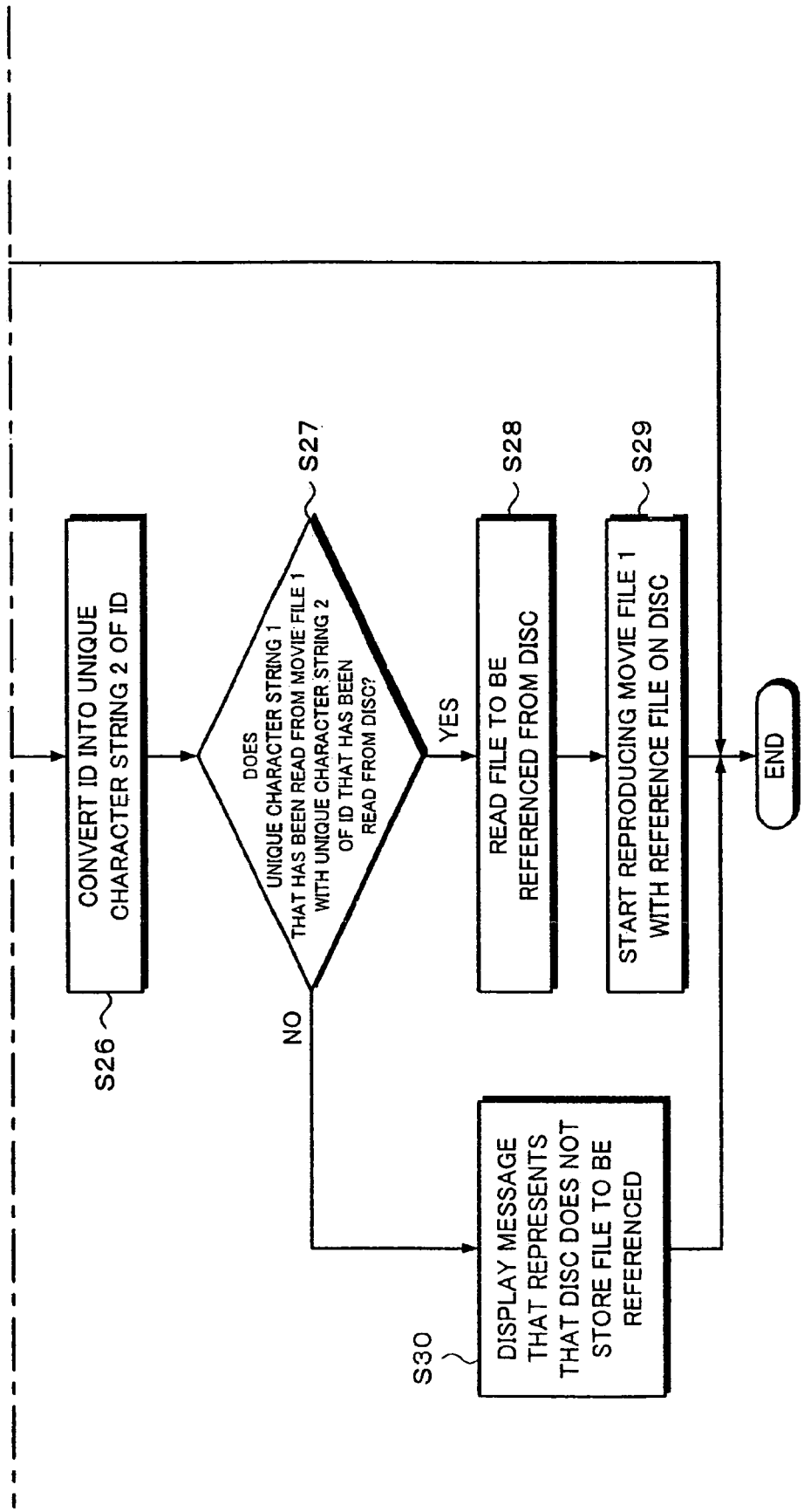

RECORDING APPARATUS, RECORDING METHOD, REPRODUCING APPARATUS, REPRODUCING METHOD, AND RECORD MEDIUM

This is a continuation of application Ser. No. 09/672,863 filed Sep. 28, 2000, now U.S. Pat. No. 7,027,717, the entirety of which is incorporated herein by reference.

BACKGROUND OF THE INVENTION

1. Field of the Invention

The present invention relates to a recording apparatus, a recording method, a reproducing apparatus, a reproducing method, and a record medium, in particular, to those corresponding to a multimedia format such as QuickTime.

2. Description of the Related Art

To handle data recorded by a recording and reproducing apparatus having a built-in camera, a digital audio reorder, or the like, a file format corresponding to a computer process is considered. For example, as system software corresponding to multimedia, QuickTime is known. QuickTime is software that handles data that varies on time base (such data is referred to as movie). Generally speaking, QuickTime is an OS's extended function that allows a moving picture to be reproduced without need to dedicated hardware. In QuickTime, various data formats can be handled. In other words, up to 32 tracks of outputs of audio data, moving picture, MDI, and so forth can be synchronized.

A QuickTime movie file is largely divided into two portions that are a movie resource portion and a movie data portion. The movie resource portion contains information representing the reproduction duration of the QuickTime file and reference information for referencing the real data. The movie data portion contains video real data and audio real data.

With a video fila and an audio file having such a file format containing the real data storing portion and the reference information storing portion, video data and audio data can be edited as a non-linear editing operation. In this case, both the storing portions may be often contained in one file as a video file or a audio file. In other words, by reading such a file, real data and a reproducing method thereof can be obtained. Such a file is referred to as self-contained type file (first file format).

In another format of a file created by editing a video file and an audio file are edited, after the video file and the audio file are edited, real data and a reference information storing portion are newly created and contained in one file. For example, when two files are combined and thereby a new file is created, the new file is composed of a real data storing portion and a reference information storing portion of which the original two files have been combined. In this editing method, original data may be lost. In addition, as files are edited, a large amount of data should be rewritten. Thus, it takes a long time to perform the editing process. When the original data is stored as it is, both the original data and the edited data are stored. As a result, the recordable capacity of the data record medium decreases.

To solve such a problem, a file that contains only a reference information storing portion that allows only a required portion to be referenced from a real data portion of an existing file may be newly created and edited. In this method, a file that contains only a reference information storing portion as an edited result is recorded to a record medium. A file that contains only a reference information storing portion for referencing external real data is referred to as external-referenced type file (second file format). In the case of the external-referenced type file, a description that designates a file that contains a real data portion that is referenced is required (this description is referred to as reference file information). In the second file format, unlike with the first file format of which a file contains both a reference information storing portion as an edited result and a real data storing portion, the editing time does not become long. In addition, a problem of which original data is not lost does not take place.

FIG. 16 shows a concept of the state of which a self-contained type file 102, which contains a movie resource portion and a movie data portion, and an external-referenced type file 103, which contains only a movie resource portion, have been recorded on a rewritable optical disc 101. The optical disc 101 is a removable disc (attachable and detachable). Thus, a situation of which data of a plurality of optical discs is edited by a personal computer 121 shown in FIG. 17 can be considered.

In FIG. 17, reference numeral 111 represents an optical disc recorder such as a disc recording and reproducing apparatus having a built-in camera or a digital audio recorder. A conventional recorder normally has a reproducing function. The optical disc recorder 111 records video data and audio data to optical discs 101a, 101b, and so forth. These optical discs 101a, 101b, and so forth are inserted into a drive of the personal computer 121. A plurality of files of the optical discs 101a, 101b, and so forth are read to a hard disk 122 of the personal computer 121. Such an operation is referred to as copy or move. The copy is an operation that allows data of the copy source to remain. In contrast, the move is an operation that allows data of the copy source not to remain. Real data (a movie data portion) of a file is not read to the personal computer 121. Instead, only reference information (a movie resource portion) is read to the personal computer 121.

The personal computer 121 pre-installs QuickTime as software. The user edits data on QuickTime. Thereafter, the user copies or moves the edited result to the optical disc 101c. The data recorded on the optical disc 101c is reproduced by a recorder 111. The edited result is recorded in the above-described external-referenced type file format to the optical disc 101c. A reproduction corresponding to the edited result is referred to as program reproduction.

In the method for storing the edited result in the external-referenced type file format, a description should uniquely designate a file to be referenced. In the system shown in FIG. 17, when a file is read from one optical disc to the personal computer 121 and the edited result is rewritten to the same optical disc, a problem of which an unintended file is referenced does not take place.

However, when the edited result is mistakenly copied or moved to an improper disc and the disc contains the same identification information (for example, file name) as that of the movie file to be referenced, a program of which a program irrespective of the edited result is reproduced takes place. In addition, when data of a plurality of optical discs 101a, 101b, and so forth is read to the hard disk 122 of the personal computer 121 and the data is edited, files that are read from different optical discs may have the same identification information. As a result, the edited result stored in the external-referenced type file format may designate an unintended file.

OBJECTS AND SUMMARY OF THE INVENTION

Therefore, an object of the present invention is to prove a recording apparatus, a recording method, a reproducing apparatus, a reproducing method, and a record medium that allow an unintended file to be prevented from being referenced upon recording data in a file structure having a real data storing portion and a reference information storing portion corresponding to a multimedia data format such as QuickTime.

A first aspect of the present invention is a recording apparatus for recoding digital data to a record medium that is removable and assigned unique medium identification information, comprising a converting means for converting data to be recorded into a file structure that allows a first file format and a second file format to be used, the first file format being handled by computer software and composed of a reference information storing portion and a real data storing portion, the second file format being composed of only a reference information storing portion, and a recording means for recording data having the file structure to the record medium, wherein reference file information and medium identification information of the record medium or information of which the medium identification information has been converted are recorded to at least the reference information storing portion of a file having the second file format.

A second aspect of the present invention is a recording apparatus for recording digital data to a record medium that is removable and assigned unique medium identification information in a file structure that allows a first file format and a second file format to be used, the first file format being handled by computer software and composed of a reference information storing portion and a real data storing portion, the second file format being composed of only a reference information storing portion, wherein when a file that is read from a record medium is edited and the edited result is stored to the record medium in the second file format, unique medium identification information of the record medium is read and the medium identification information or information of which the medium identification information has been converted and reference file information are recorded to the reference information storing portion along with the edited result.

A third aspect of the present invention is a recording method for recoding digital data to a record medium that is removable and assigned unique medium identification information, comprising the steps of converting data to be recorded into a file structure that allows a first file format and a second file format to be used, the first file format being handled by computer software and composed of a reference information storing portion and a real data storing portion, the second file format being composed of only a reference information storing portion, and recording data having the file structure to the record medium, wherein reference file information and medium identification information of the record medium or information of which the medium identification information has been converted are recorded to at least the reference information storing portion of a file having the second file format.

A fourth aspect of the present invention is a recording method for recording digital data to a record medium that is removable and assigned unique medium identification information in a file structure that allows a first file format and a second file format to be used, the first file format being handled by computer software and composed of a reference information storing portion and a real data storing portion, the second file format being composed of only a reference information storing portion, comprising the steps of when a file that is read from a record medium is edited and the edited result is stored to the record medium in the second file format, reading unique medium identification information of the record medium, and recording the medium identification information or information of which the medium identification information has been converted and reference file information to the reference information storing portion along with the edited result.

A fifth aspect of the present invention is a reproducing apparatus for reproducing digital data from a record medium that is removable and assigned unique medium identification information, the digital data having a file structure that allows a first file format and a second file format to be used, the first file format being handled by computer software and composed of a reference information storing portion and a real data storing portion, the second file format being composed of only a reference information storing portion, reference file information and medium identification information of the record medium or information of which the medium identification information has been converted being recorded to at least the reference information storing portion of a file having the second file format, comprising a means for determining the file format of data that is read from the record medium and for reproducing the data when the file format of the data that has been read is the first file format, a means for reading the reference file identification information and the medium identification information or the information of which the medium identification information has been converted from the reference information storing portion when the file format of the data that has been read is the second file format, a means for reading the medium identification information or the information of which the medium identification information has been converted and the reference file information from the record medium, and a means for determining whether or not the medium identification information or the information of which the medium identification information has been converted recorded in the reference information storing portion matches the medium identification information or the information of which the medium identification information has been converted recorded on the record medium and for reading a file designated by the reference file information and reproducing the file when they match.

A sixth aspect of the present invention is a reproducing method for reproducing digital data from a record medium that is removable and assigned unique medium identification information, the digital data having a file structure that allows a first file format and a second file format to be used, the first file format being handled by computer software and composed of a reference information storing portion and a real data storing portion, the second file format being composed of only a reference information storing portion, reference file information and medium identification information of the record medium or information of which the medium identification information has been converted being recorded to at least the reference information storing portion of a file having the second file format, comprising the steps of determining the file format of data that is read from the record medium and for reproducing the data when the file format of the data that has been read is the first file format, reading the reference file identification information and the medium identification information or the information of which the medium identification information has been converted from the reference information storing portion when the file format of the data that has been read is the second file format, reading the medium identification information or the information of which the medium identification information has been converted and the reference file information from the record medium, and determining whether or not the medium identification information or the information of which the medium identification information has been converted recorded in the reference information storing portion matches the medium identification information or the information of which the medium identification information has been converted recorded on the record medium and for reading a file designated by the reference file information and reproducing the file when they match.

A seventh aspect of the present invention is a record medium on which digital data has been recorded, the record medium being removable and assigned unique medium identification information, the digital data having a file structure that allows a first file format and a second file format to be used, the first file format being handled by computer software and composed of a reference information storing portion and a real data storing portion, the second file format being composed of only a reference information storing portion, reference file information and medium identification information of the record medium or information of which the medium identification information has been converted being recorded to at least the reference information storing portion of a file having the second file format.

According to the present invention, in the case of at least an external reference file, in addition to the reference file information, medium identification information of a record medium or information of which medium identification information has been converted is recorded to a reference information storing portion. Thus, with medium identification information of an external-referenced type file, a medium can be checked. When the medium identification information recorded in the external-referenced type file does not match the medium identification information that is read from a record medium, it is clear that the record medium does not record a file to be referenced.

The following US patents are prior patents of the present invention.

(1) U.S. Pat. No. 4,945,475
(2) U.S. Pat. No. 5,253,053
(3) U.S. Pat. No. 5,652,879

In addition, the applicant of the present invention has filed the following Japanese patent applications.

(1) Japanese Patent Application No. 11-264630 filed on Sep. 17, 1999
(2) Japanese Patent Application No. 11-264631 filed on Sep. 17, 1999
(3) Japanese Patent Application No. 11-279993 filed on Sep. 30, 1999

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 4A and 4B are schematic diagrams for explaining an example of the relation between compression-encoded audio data and a QuickTime file format according to the embodiment of the present invention;

FIG. 13 is a flow chart for explaining a process upon reproducing a file according to the embodiment of the present invention;

DETAILED DESCRIPTION OF THE PREFERRED EMBODIMENTS

Figure 1:
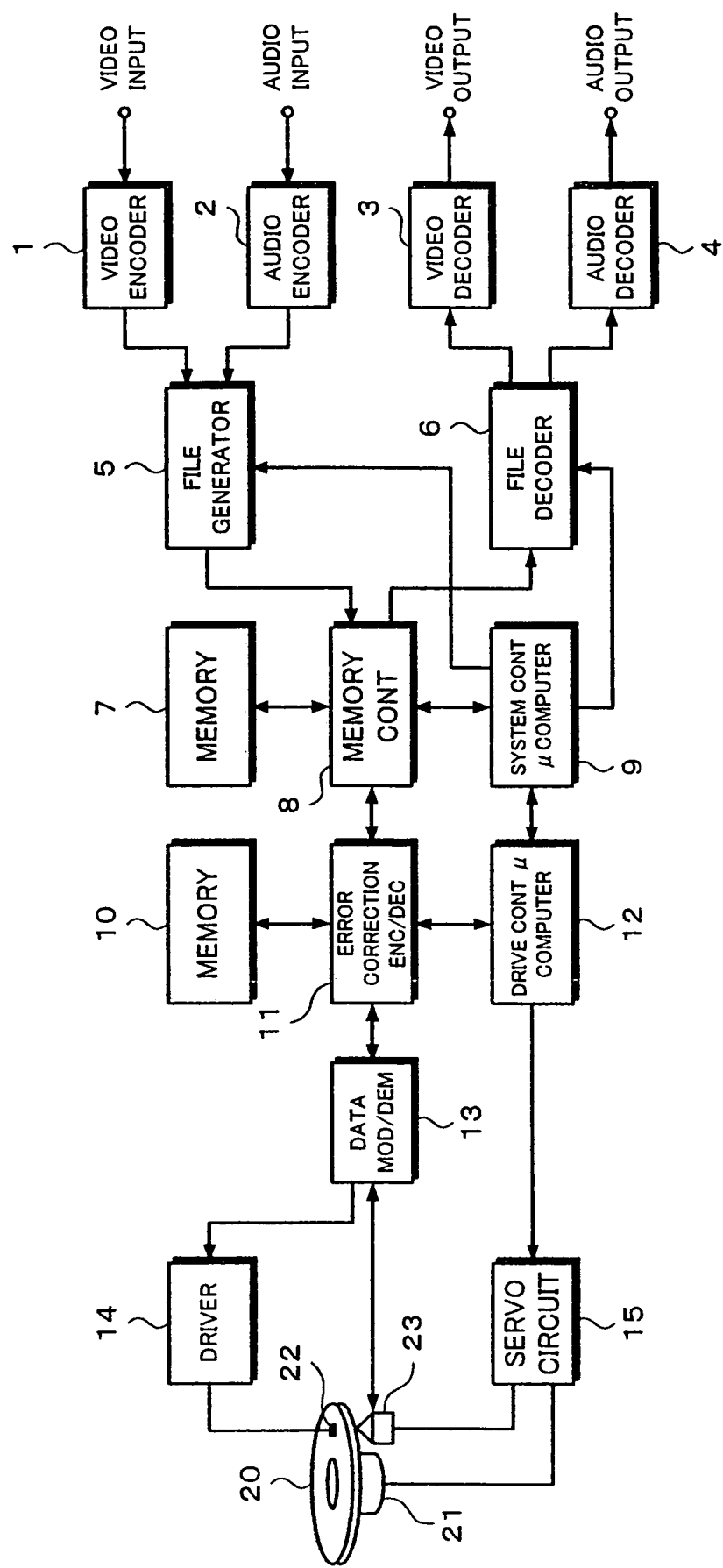
FIG. 1 is a block diagram showing the structure of an embodiment of the present invention.

Hereinafter, an embodiment of the invention will now be described with reference to the drawings. FIG. 1 shows an example of the structure of a digital recording and reproducing apparatus according to the embodiment of the present invention. In FIG. 1, 1 denotes digital encoder. A video input is supplied to a video encoder 1. The video enoder 1 compression-encodes the video signal. Thus, 2 denotes an audio encoder. As audio inputs of audio encoder 2, an audio signal is compression-encoded. For example, MPEG is used for the compression-encoding process toward video signals and audio signals. The outputs of video encoder 1 and audio encoder 2 are referred as the element streams.

When MPEG is used, the video encoder 1 is composed of a motion predicting portion, a picture sequence rearranging portion, a subtracting portion, a DCT portion, a quantizing portion, a variable length code encoding portion, and a buffer memory. The motion predicting portion detects a moving vector. The subtracting portion forms a predictive error between an input picture signal and a locally decoded picture signal. The DCT portion transforms an output signal of the subtracting portion corresponding to the DCT method. The quantizing portion quantizes an output signal of the DCT portion. The variable length encoding portion encodes an output signal of the quantizing portion into a signal having a variable length. The buffer memory outputs the encoded data at a constant data rate. The picture sequence rearranging portion rearranges the sequence of pictures corresponding to the encoding process. In other words, the picture sequence rearranging portion rearranges the sequence of pictures so that after I and P pictures are encoded, a B picture is encoded. The local decoding portion is composed of an inverse quantizing portion, an inverse DCT portion, an adding portion, a frame memory, and a motion compensating portion. The motion compensating portion performs all of a forward predicting operation, a reverse predicting operation, and a bidirectional predicting operation. When the intra encoding process is performed, the subtracting portion directly passes data, not performs the subtracting process. The audio encoder 2 comprises a sub-band encoding portion and an adaptively quantized bit allocating portion.

As an example, in the case of a portable disc recording and reproducing apparatus with a built-in camera, a picture photographed by the camera is input as video data. In addition, a voice collected by a microphone is input as audio data. The video encoder 1 and the audio encoder 2 convert analog signals into digital signals. According to the embodiment of the present invention, a rewritable optical disc is used as a record medium. Examples of such an optical disc are a magneto-optical disc and a phase-change type disc. According to the embodiment of the present invention, a magneto-optical disc having a relatively small diameter is used.

Output signals of the video encoder 1 and the audio encoder 2 are supplied to a file generator 5. The file generator 5 converts output signals of the video encoder 1 and the audio encoder 2 into a video elementary stream and an audio elementary stream so that they can be handled corresponding to a computer software program for synchronously reproducing a moving picture and a sound without need to use a dedicated hardware portion. According to the embodiment of the present invention, for example, as such a software program, QuickTime is used. A sequence of data (video data, audio data, and text data) that varies on time base and that is process by QuickTime is referred to as QuickTime movie. The file generator 5 multiplexes encoded video data and encoded audio data. To generate a QuickTime movie file, a system controlling microcomputer 9 controls the file generator 5.

QuickTime movie files generated by the file generator 5 are successively written to a memory 7 through a memory controller 8. When the system controlling microcomputer 9 issues a data write request for a disc to the memory controller 8, the memory controller 8 reads a QuickTime movie file from the memory 7. In this example, the transfer rate of the encoding process for a QuickTime movie file is lower than that for data written to the disc. For example, the former is half of the latter. Thus, although QuickTime movie files are successively written to the memory 7, they are intermittently read from the memory 7 under the control of the system controlling microcomputer 9 in such a manner that the memory 7 is prevented from overflowing or underflowing.

A QuickTime movie file that is read from the memory 7 through the memory controller 8 is supplied to an error correction encoder/decoder 11. The error correction encoder/decoder 11 temporarily writes a QuickTime movie file to a memory 10. The error correction encoder/decoder 11 performs an interleaving process and an error correction code encoding process so as to generate redundant data. The error correction encoder/decoder 11 reads the QuickTime movie file with redundant data from the memory 10.

Output data of the error correction encoder/decoder it is supplied to a data modulator/demodulator 13. When digital data is recorded on the disc, the data modulator/demodulator 13 modulates the data in such a manner that a clock signal can be easily extracted so that data can be recorded on a disc free from a problem such as an inter-code interference. For example, RLL (1, 7) can be used.

An output signal of the data modulator/demodulator 13 is supplied to a magnetic field modulating driver 14. In addition, a signal for driving an optical pickup 23 is output to the magnetic field modulating driver 14. The magnetic field modulating driver 14 drives a magnetic field head 22 corresponding to the input signal so as to apply a magnetic field to an optical disc 20. The optical pickup 23 radiates a recording laser beam to the optical disc 20. In such a manner, data is recorded on the optical disc 20. The optical disc 20 is rotated at CLV (Constant Linear Velocity), CAV (Constant Angular Velocity), or ZCAV (Zone CLV of which the disc surface area is divided into for example three areas in each of which the optical disc 20 is rotated at CAV in such a manner that the velocity of the innermost area is the highest and the velocity of the outermost area is the lowest).

Since data that is intermittently read from the memory controller 8 is recorded to the optical disc 20, data is not successively recorded. In other words, after a predetermined amount of data is recorded, the recording operation is stopped until the next record request is received.

When the system controlling microcomputer 9 issues a request to a drive controlling microcomputer 12, it issues a request to a servo circuit 15 so as to control the entire disc drive. Thus, the disc drive performs a recording operation. The servo circuit 15 performs a disc radial moving servo operation, a tracking servo operation, and a focus servo operation for the optical pickup 23. In addition, the servo circuit 15 performs a spindle servo operation for a motor 21. In association with the system controlling microcomputer 9, a user operation input portion (not shown) is disposed.

On the optical disc 20 as a blank disc, a unique disc ID (for example, serial number) has been recorded. For example, the disc ID has been recorded in the innermost peripheral area of the disc. The innermost peripheral area is a rewrite prohibition area. As will be described later, according to the present invention, a file is properly referenced with the disc ID. In addition, the disc ID is often used to assure that the disc is a regal disc for copyright protection. In other words, when the optical disc 20 is inserted into a recorder, an authenticating process is performed with the disc ID. When the disc ID has not been substantially recorded, the disc is treated as an illegal disc and thereby it is riot successfully authenticated. As a result, data is prohibited from being recorded and/or reproduced to/from the disc. From a view point of copyright protection, a structure of which the disc ID cannot be read to the outside of a device such as a recorder is used. Thus, the disc ID is not used as it is. Instead, the disc ID is converted into for example a character string corresponding to a predetermined rule such as an encryption.

Next, the structure and operation of the reproducing portion will be described. When data is reproduced, a reproducing laser beam is radiated to the optical disc 20. A detector of the optical pickup 23 converts the reflected light of the optical disc 20 into a reproduction signal. A tracking error and a focus error are detected from an output signal of the detector of the optical pickup 23. The servo circuit 15 controls the optical pickup 23 so that the optical pickup 23 is placed and focused on a desired track. In addition, the servo circuit 15 controls the radial movement of the optical pickup 23 so that it reproduces data on a desired track of the optical disc 20.

As with the recording operation, when data is reproduced, the transfer rate of data reproduced from the optical disc 20 is higher than that of a QuickTime movie file. For example, the transfer rate of data reproduced form the optical disc 20 is twice as large as the transfer rate of a QuickTime movie file. Likewise, data is not successively reproduced from the optical disc 20. In other words, an intermittent reproducing operation is performed in such a manner that after a predetermined amount of data is reproduced, the reproducing operation is stopped until the next reproducing request is received. As with the recording operation, in the reproducing operation, when the system controlling microcomputer 9 issues a request to the drive controlling microcomputer 12, it issues a request to the servo circuit 15 so as to control the entire disc drive.

The reproduction signal that is output from the optical pickup 23 is input to the data modulator/demodulator 13. The data modulator/demodulator 13 demodulates the reproduction signal. The demodulated data is supplied to the error correction encoder/decoder 11. The error correction encoder/decoder 11 temporarily writes the reproduction data to the memory 10. The error correction encoder/decoder 11 performs a deinterleaving process and an error correcting process for the reproduction data. The error-corrected QuickTime movie file is written to the memory 7 through the memory controller 8.

A QuickTime movie file written to the memory 7 is output to a file decoder 6 in synchronization with a demultiplexing timing corresponding to a request issued by the system controlling microcomputer 9. The system controlling microcomputer 9 supervises the amount of data that is reproduced from the optical disc 20 and written to the memory 7 and the amount of data that is read from the memory 7 and output to the file decoder 6 so as to successively reproduce the video signal and the audio signal. In addition, the system controlling microcomputer 9 controls the memory controller 8 and the drive controlling microcomputer 12 so as to read data from the optical disc 20 in such a manner that the memory 7 does not overflow or underflow.

The file decoder 6 decodes a QuickTime movie file into a video elementary stream and an audio elementary stream under the control of the system controlling microcomputer 9. The video elementary stream is supplied to a video decoder 3. The audio elementary stream is supplied to an audio decoder 4. The video elementary stream and the audio elementary stream are synchronously output from the file decoder 6.

The video decoder 3 and the audio decoder 4 compression-decode the video elementary stream and the audio elementary stream and generate a video output signal and an audio output signal, respectively. In this example, the video signal and the audio signal have been encoded corresponding to MPEG. A video output signal is output to a display (liquid crystal display or the like) through a display driver and displayed as a picture. Likewise, an audio output signal is output to a speaker through an audio amplifier and reproduced as a sound (these structural portions are not shown).

The video decoder 3 is composed of a buffer memory, a variable length code decoding portion, an inverse DCT portion, an inverse quantizing portion, an adding portion, and a local decoding portion. The adding portion adds an output signal of the inverse quantizing portion and a local decoded output signal. The local decoding portion is composed of a picture sequence rearranging portion, a frame memory, and a motion compensating portion. When an intra encoding process is performed, the adding portion directly passes data, not performs the adding process. Decoded data is output from the adding portion to the picture sequence rearranging portion. The picture sequence rearranging portion rearranges the decoded pictures in the original order.

As was described above, since the optical disc 20 on which data is recorded is attachable and detachable, the data recorded on the optical disc 20 can be reproduced by another apparatus. For example, a personal computer that operates with QuickTime application software may read data recorded on the optical disc 20 and reproduce video data and audio data therefrom. It should be noted that the present invention can be applied to an apparatus that handles only video data or only audio data.

Next, the embodiment of the present invention will be described in more detail. First of all, with reference to FIG. 2, QuickTime will be described in brief. QuickTime is an OS expansion function for reproducing a moving picture without need to use dedicated hardware. There are various data formats for QuickTime. In other words, audio data, video data, MDI, and so forth of up to 32 tracks can be synchronously output.

A QuickTime movie file is roughly divided into two major portions that are a movie resource portion and a movie data portion. The movie resource portion contains time data necessary for reproducing the QuickTime movie file and information necessary for referencing real data. The movie data portion contains real data of video data and real data of audio data.

One QuickTime movie file can contain different types of medium data such as a sound, a video, and a text as independent tracks that are a sound track, a video track, and a text track, respectively. These independent tracks are strictly controlled on time base. Each track has a medium for referencing the compression method of the real data and the display time period thereof. The medium contains the minimum sample size of the real data in the movie data portion, the position of a chunk that is a block of a plurality of samples, and the display duration of each sample.

Figure 2:
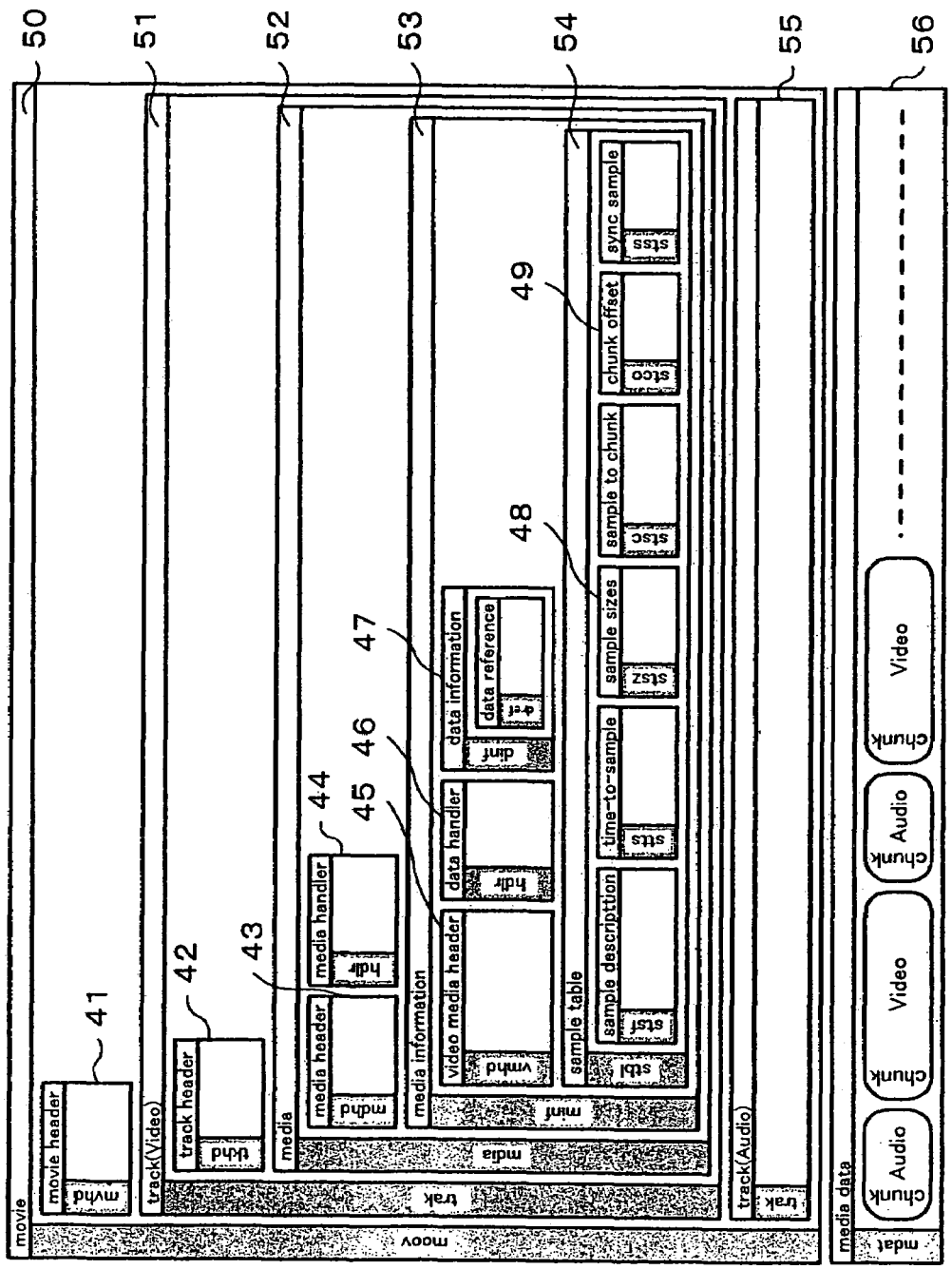
FIG. 2 is a schematic diagram showing an example of a QuickTime file format according to the present invention.

FIG. 2 shows an example of a QuickTime file that handles audio data and video data. The largest structural portions of the QuickTime file are a movie resource portion and a movie data portion. The movie resource portion contains the duration necessary for reproducing the file and data necessary for referencing the real data. The movie data portion contains real data of video data, audio data, and so forth.

Next, the structure of the movie resource portion will be described in detail. The movie resource portion 50 has a hierarchical structure of a header portion 50, a track portion 51, a media portion 52, a media information portion 53, and a sample table portion 54. The header portion 50 describes information about the entire file. The track portion 51 describes information about each part of the movie data. The media portion 52 describes information about each part of data. The movie resource portion is used for one video track. Likewise, one QuickTime movie file contains a resource portion 55 for an audio track. The structure of the resource portion 55 is the same as the structure of the movie resource portion.

The header portion 50 contains a movie header 41. The track portion 51 contains a track header 42 that describes general information about the track. The media portion 52 contains a media header 43 and a media handler 44. The media header 43 describes general information about the media. The media handler 44 describes information for handling the media data. The media information portion 53 contains a media handler 45, a data handler 46, and data information portion 47. The media handler 45 describes information about the picture media. The data handler 46 describes information for handling the picture data. The data information portion 47 describes information about the data. The sample table portion 54 contains a sample description, a time-to-sample, a sample size 48, a sample-to-chunk, a chunk offset 49, a sync sample, and so forth. The sample description describes each sample. The time-to-sample describes the relation between samples and time base. The sample size 48 describes the size of each sample. The sample-to-chunk describes the relation between samples and chunks. The chunk offset 49 describes the start bit position of a chunk in the movie file. The sync sample describes information about synchronization.

On the other hand, the movie data portion 56 contains audio data encoded corresponding to for example MPEG Audio Layer 2 and picture data encoded in the compression-encoding method corresponding to for example MPEG method in the unit of chunks each of which is composed of a predetermined number of samples. However, it should be noted that the present invention is not limited to such an encoding method. In addition, the moving data portion may contain linear data that has not been compression-encoded.

Each track of the movie resource portion is correlated with data contained in the movie data portion. In other words, in the example shown in FIG. 2, since audio data and video data are handled, the movie resource portion contains a video track and an audio track. The movie data portion contains real data of the audio data and real data of the video data. When other types of data are handled, the movie resource portion contains their tracks and the movie data portion contains real data thereof. For example, when a text and MIDI are handled, the movie resource portion contains tracks of the text and the MIDI and the movie data portion contains real data thereof.

Next, a method for converting compressed video data (video elementary stream) and compressed audio data (audio elementary stream) into a QuickTime file format in the case that MPEG2 is used as a decoding method for data that has been compression-encoded will be described. First of all, MPEG will be described. MPEG has a hierarchical structure of six layers that are a sequence layer, a GOP layer, a picture layer, a slice layer, a macro block layer, and a block layer in the order of the highest hierarchical level. A header is placed at the beginning of each of the six layers. For example, a sequence header is a header placed at the beginning of the sequence layer. The sequence header contains a sequence start code, a horizontal screen size, a vertical screen size, an aspect ratio, a picture rate, a bit rate, a VBV buffer size, a restriction parameter bit, a load flag of two quantized matrixes, and a content.

According to MPEG, there are three picture types I, P, and B. In an I picture (Intra-coded picture), when a picture signal is encoded, information of only one picture is used. Thus, when an encoded picture signal is decoded, information of only the I picture is used. In a P picture (Predictive-coded picture), as a predictive picture (a reference picture for obtaining a difference with the current P picture), an I picture or another P picture that has been decoded is temporally followed by the current P picture. The difference between the current P picture and a motion-compensated predictive picture is encoded for each macro block. Alternatively, the current P picture is encoded for each macro block without obtaining the difference of such pictures. One of those methods is selected whichever higher efficiency is obtained. In a B picture (Bidirectionally predictive-coded picture), as predictive pictures (reference pictures for obtaining a difference with the current B picture), three types of reference pictures are used. The first type reference picture is an I picture or a P picture that has been decoded and that is temporally followed by the current B picture. The second type reference picture is an I picture or a P picture that has been decoded and that is temporally preceded by the current B picture. The third type reference picture is an interpolated picture of the first type reference picture and the second type reference picture. The difference between the current B picture and each of the three type reference pictures that have been motion-compensated is encoded for each macro block. Alternatively, the current B picture is encoded for each macro block without obtaining such a difference. One of those methods is selected whichever higher efficiency is obtained.

Thus, there are a frame intra-coded macro block, a forward inter-frame predictive macro frame (a future macro block is predicted with a past macro block), a backward inter-frame predictive macro block (a past macro block is predicted with a future macro block), and a bidirectional macro block (a current macro block is predicted with both a future macro block and a past macro block). All macro blocks in an I picture are intra-frame coded macro blocks. A P picture contains intra-frame coded macro blocks and forward inter-frame predictive macro blocks. A B picture contains the above-described four types of macro blocks.

In MPEG, a GOP (Group Of Pictures) structure that is a group of pictures is defined so that data can be random-accessed. In MPEG, a GOP is defined as follows. The first picture of one GOP is an I picture. The last picture of one GOP is an I picture or a P picture. A GOP that is predicted with the last I or P picture of the preceding GOP is permitted. A GOP that can be decoded without a picture of the preceding GOP is referred to as closed GOP. According to the embodiment, as a structure of a closed GOP, each GOP can be edited.

In MPEG audio (compressing method), three modes of layer 1, layer 2, and layer 3 have been defined. In layer 1, for example 32 sub-band encoding operation and adaptive bit allocating operation are performed. One audio decoding unit is composed of 384 samples. One audio decoding unit is one audio frame of an audio bit stream. The audio decoding unit is the minimum unit of which encoded data is decoded to audio data. Likewise, the video decoding unit corresponding to one video frame has been defined. In NTSC system, one video frame is equivalent to 1/30 seconds. Normally, the bit rate of stereo audio in layer 1 is 256 kbps. In layer 2, a 32 sub-band encoding operation and an adaptive bit allocating operation are performed. One audio decoding unit is composed of 1152 samples. Normally, the bit rate of stereo audio in layer 2 is 192 kbps.

Figures 3A, 3B:
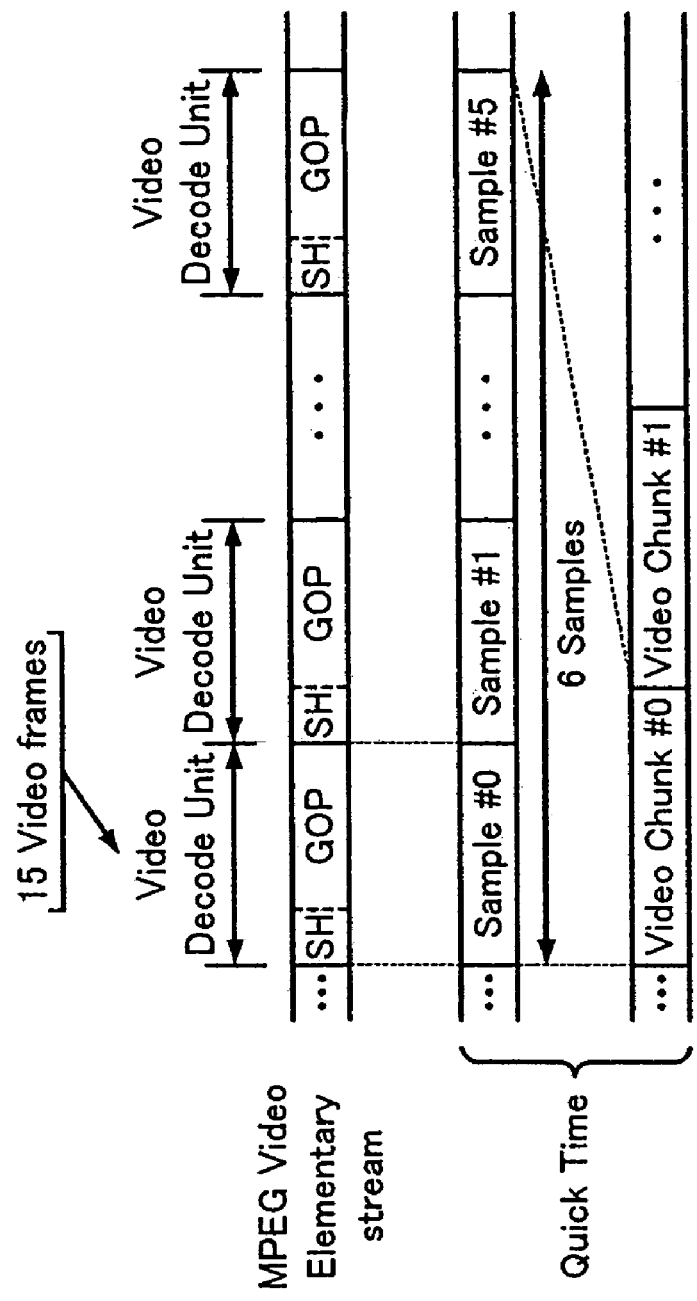
FIGS. 3A and 3B are schematic diagrams for explaining the relation between GOPs of the MPEG video and a QuickTime file format according to the embodiment of the present invention.

The file generator 5 converts video data and audio data that have been compressed corresponding to MPEG into a file structure corresponding to the above-described Quick-Time file format. FIGS. 3A and 3B show the relation among video frames, GOPs, and units of samples and chunks of the QuickTime file format. As was described above, one sample is the minimum unit of movie data. One chunk is a unit of which a plurality of samples are collected as a block.

As shown in FIG. 3A, for example 15 video frames of an original video signal are compression-encoded corresponding to MPEG2 and thereby one GOP is generated. 15 video frames are equivalent to 0.5 seconds. Each GOP is preferably structured as a closed GOP. A sequence header is placed at the beginning of each GOP. The sequence header and one GOP compose one video decoding unit. Since a sequence header is placed to each GOP, each sample can be directly edited and decoded with QuickTime. The video encoder 1 shown in FIG. 1 outputs an MPEG video elementary stream shown in FIG. 3A.

As shown in FIG. 3B, one video decoding unit is treated as one sample of the QuickTime file format. Six chronologically successive samples (for example, sample #0 to sample #5) are treated as one video chunk (for example, chunk #0). The duration of one chuck is 3 seconds. Alternatively, six GOPs may be treated as one video chunk so that one chuck corresponds to one sample. In this case, the duration of one chuck is 3 seconds.

FIG. 4 shows the relation among audio frames encoded corresponding to MPEG audio layer 2, GOPs, and units of samples and chunks in the QuickTime file format. In layer 2, 1152 audio samples/channel are treated as one audio frame. As shown in FIG. 4A, in stereo, 1152 audio samples×2 channels are encoded in layer 2 and treated as one audio decoding unit. One audio decoding unit contains data of 384 bytes×2 channels that have been compression-encoded. The audio decoding unit contains a header and information necessary for decoding the encoded data (allocation, scale factor, and so forth).

As shown in FIG. 4B, one audio decoding unit is treated as one sample of the QuickTime file format. Thus, each audio sample can be decoded with QuickTime. 125 chronological successive samples (for example, sample #0 to sample #124) are treated as one audio chunk (for example, chuck #0). The duration of one chuck is 3 seconds in the case that the audio sampling frequency is 48 kHz.

In FIGS. 3 and 4, a video data file and an audio data file are separately shown. The file generator 5 multiplexes a video data file and an audio data file as one data stream and thereby generates a QuickTime movie file. In the QuickTime movie file, video chunks and audio chucks are alternatively placed on time base. In this case, video chunks and audio chunks are placed in such a manner that a video chuck adjacents to an audio chunk corresponding thereto. As was described above, the duration of video data of one video chunk is equal to the duration of audio data of one audio chunk (for example, 3 seconds).

As another example of the audio compression-encoding method, ATRAC (Adaptive Transform Acoustic Coding) used for Mini Disc may be used. In ATRAC, audio data of 16 bits sampled at 44.1 kHz is processed. The minimum data unit processed in ATRACK is one sound unit. In stereo, one sound unit is composed of 512 samples×16 bits×2 channels.

Figure 5A:
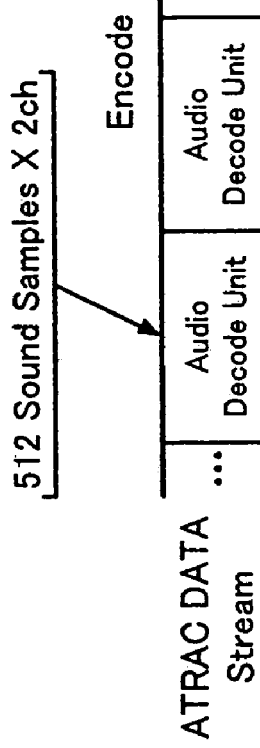
FIGS. 5A and 5B are schematic diagrams for explaining another example of the relation between compression-encoded audio data and a QuickTime file format according to the embodiment of the present invention.
Figure 5B:
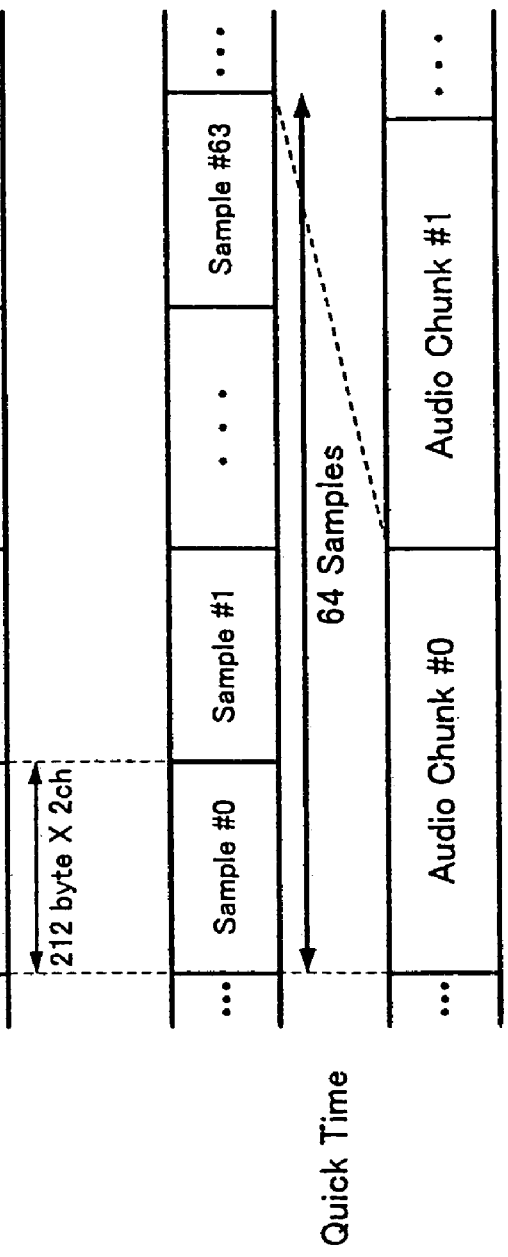

When ATRAC is used as an audio compression-encoding method, as shown in FIG. 5A, one sound unit is compressed to an audio decoding unit of 212 bytes×2 channels. As shown in FIG. 5B, one audio decoding unit is treated as one sample in the QuickTime file format. 64 samples are treated as one chunk in the QuickTime file format.

According to the present invention, the audio data may be recorded on a non-compression basis. The non-compression method is referred to as linear PCM. Likewise, in linear PCM, 512 audio samples are treated as one audio decoding unit. One audio decoding unit is treated as one sample in the QuickTime file format.

Figures 6A, 6B, 6C, 6D:
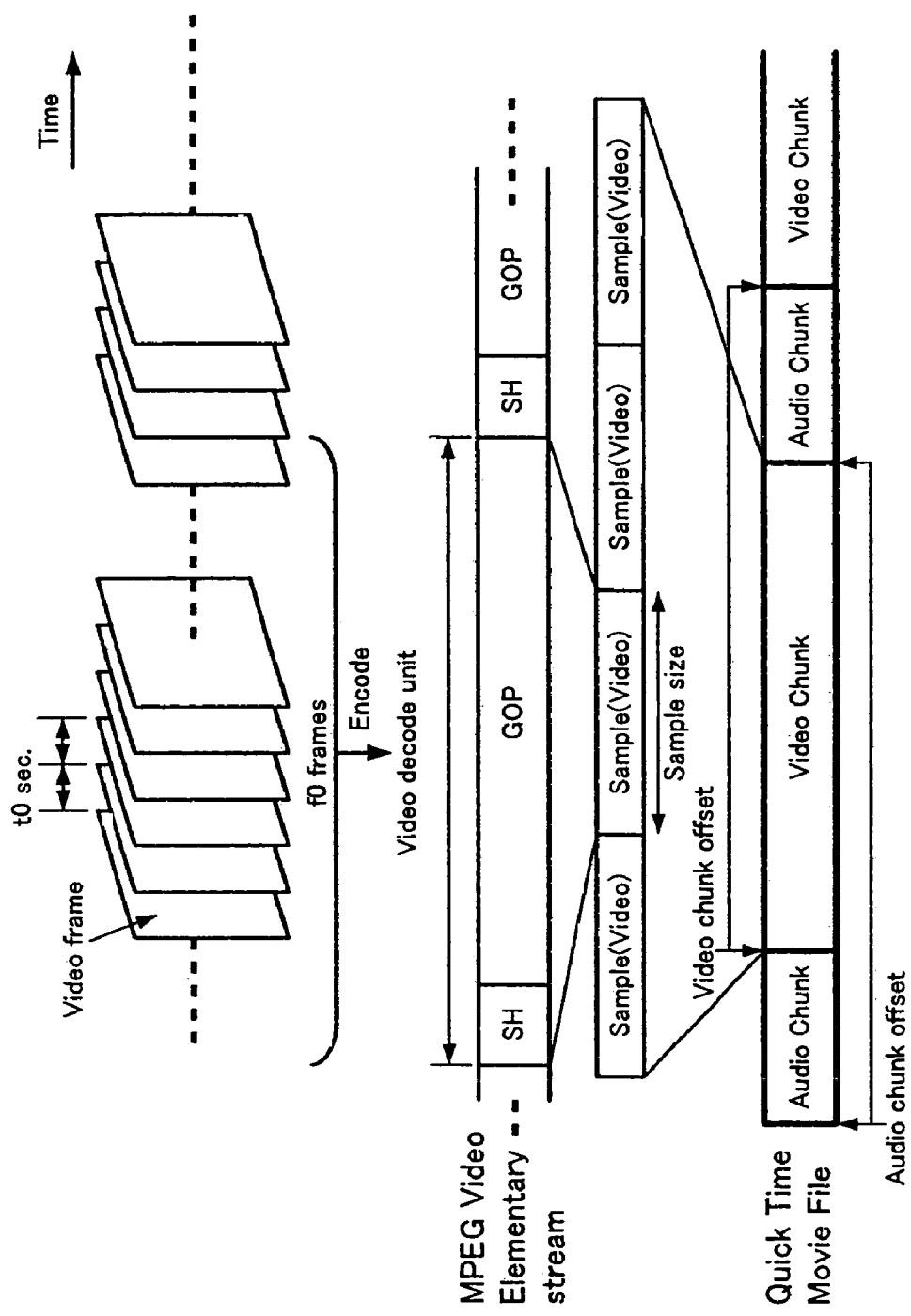
FIGS. 6A, 6B, 6C, and 6D are schematic diagrams for explaining the relation between GOPs of MPEG video data and a QuickTime file format according to the embodiment of the present invention.

FIG. 6 shows a QuickTime file format for video data in the case that video data and audio data are multiplexed. As shown in FIG. 6A, the period of a video frame is t0 seconds and the number of frames of one GOP is f0. When original video data is encoded corresponding to MPEG2, an MPEG video elementary stream shown in FIG. 6B is formed. As was described above, a sequence header (SH) is placed to each GOP.

As shown in FIG. 6C, one GOP with a sequence header is treated as one sample in the QuickTime file format. The length of one sample is referred to as sample size. With a plurality of samples (for example, six samples), one chunk is composed in the QuickTime file format. As shown in FIG. 6D, video chunks and audio chunks are alternately placed on time base and thereby multiplexed. As a result, a QuickTime movie file is formed. The beginning of each video chunk of the QuickTime movie file is referred to as video chunk offset. The video chunk offset is represented by the number of bytes from the beginning of the file to the beginning of the video chunk.

Figures 7A, 7B, 7C, 7D:
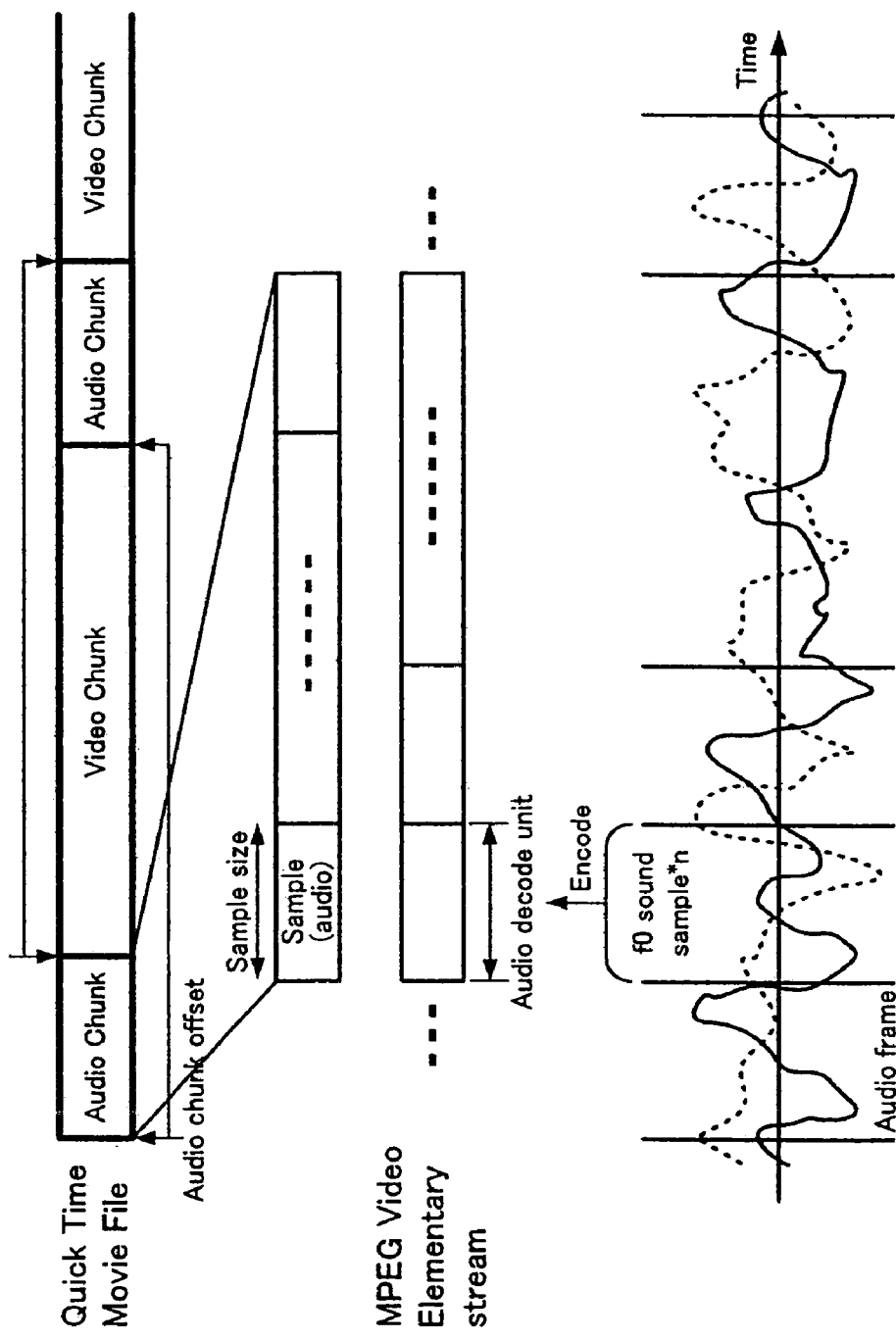
FIGS. 7A, 7B, 7C, and 7D are schematic diagrams for explaining another example of the relation between compression-encoded audio data and a QuickTime file format according to the embodiment of the present invention.

FIG. 7 shows a QuickTime file format of audio data in the case that video data and audio data are multiplexed. As shown in FIG. 7A, an original audio signal is digitized. One audio frame contains f0 audio samples×n channels. When the original audio data is compression-encoded corresponding to MPEG audio, an MPEG audio elementary stream shown in FIG. 7B is formed.

As shown in FIG. 7C, for example one audio decoding unit is treated as one sample of the QuickTime file format. The size of one sample is referred to as sample size. A plurality of samples (for example, 125 samples) composes one chunk of the QuickTime file format. As shown in FIG. 7D, video chunks and audio chunks are alternately placed and thereby multiplexed. As a result, a QuickTime movie file is formed. The beginning of each audio chunk of a QuickTime movie file is referred to as audio chunk offset. The audio chunk offset is represented by the number of bytes from the beginning of the file to the beginning of the audio chunk. The duration of each video chunk is the same as the duration of each audio chunk. For example, the duration is 3 seconds.

The sample size of a video sample, the sample size of an audio sample, the offset value of a video chunk, and the offset value of an audio chunk are contained in the resource of a QuickTime movie file. With the resource, each sample of each chunk can be designated and edited (in the encoding unit).

Figure 8:
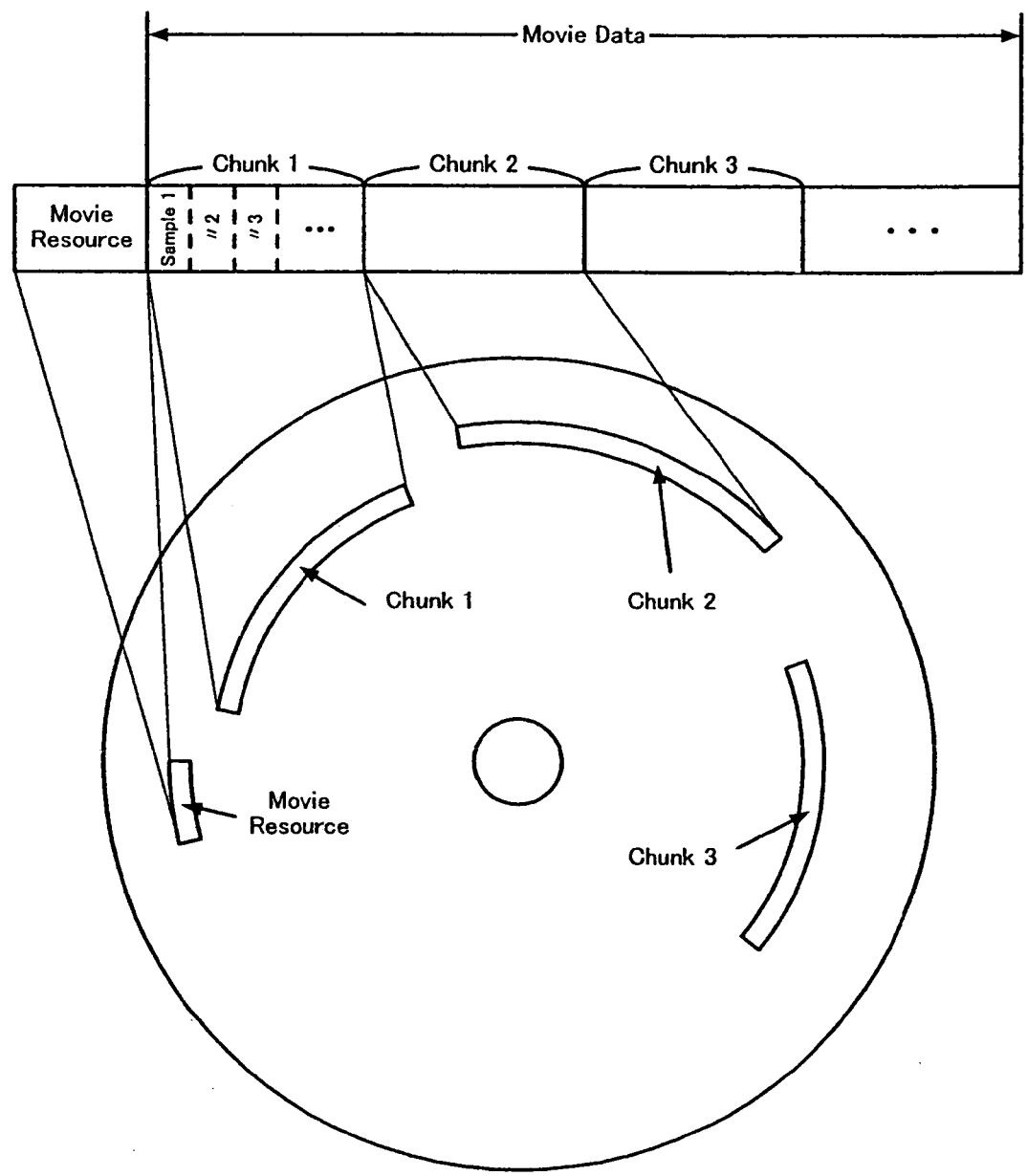
FIG. 8 is a schematic diagram for explaining an example of a recording method for an optical disc according to the embodiment of the present invention.

Next, as mentioned above, a recording method for recording a QuickTime movie file of which video chunks and audio chunks have been multiplexed (interleaved) to the optical disc 20 will be described. As described above, one QuickTime file format is roughly divided into two major portions that are a movie resource portion and a movie data portion. When a QuickTime movie file is recorded to the optical disc 20, as shown in FIG. 8, the movie resource is matched with the successive record length. In addition, each chunk (video chunk or audio chunk) of the movie data (real data) is matched with the successive record length of the disc. The successive record length means the length of which data can be written to successive addresses without a jumping operation of the optical pickup 23.

Figure 9:
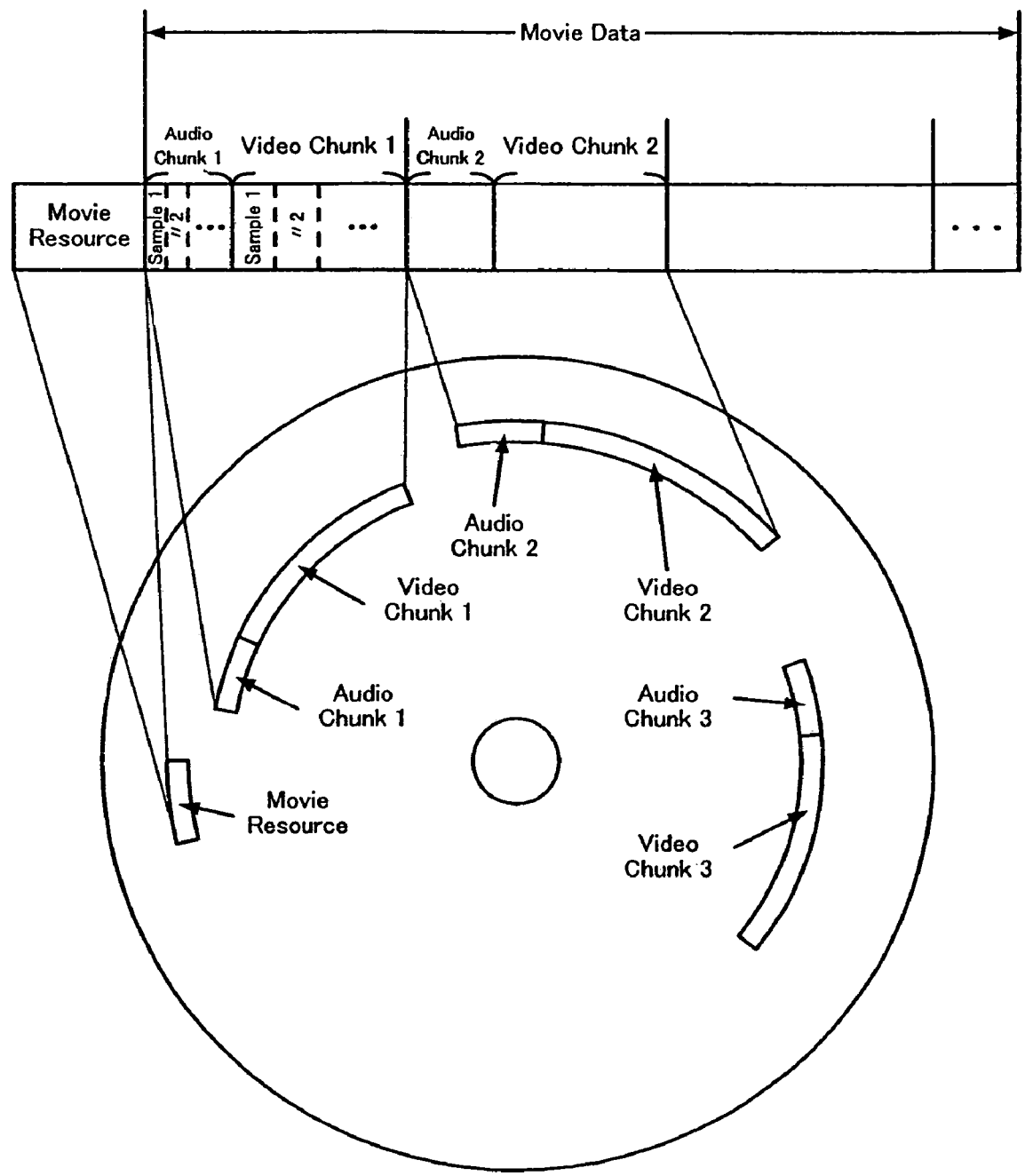
FIG. 9 is a schematic diagram for explaining another example of the recording method for an optical disc according to the embodiment of the present invention.

FIG. 9 shows another example of which a QuickTime movie file is recorded on the optical disc 20. As described above, when video chunks and audio chunks have been multiplexed, a pair of an audio chunk and an adjacent video that corresponds thereto is matched with the successive record length.

As shown in FIGS. 8 and 9, the position of the successive record length is physically not continuous. Thus, after the movie resource is reproduced, when the first audio chunk and video chunk are reproduced (namely, data of two successive record lengths is reproduced), a track jump takes place. However, as was described above, since the data transfer rate of write/read operation is higher (for example, two times higher) than the data transfer rate of a QuickTime movie file, even if data is intermittently read, successive QuickTime movie files can be reproduced.

Thus, the transfer rate of a QuickTime movie file, the read rate of data from the optical disc, the duration of the successive record length, and the seek time of the disc drive (the seek time is the duration necessary for a track jump from one track to another track) mutually relate. Thus, the duration of video data and audio data recorded in the successive record length can be selected in various manners from other than 3 seconds. It is preferred that in the duration for video frames of video data recorded in the successive record length, an integer number of audio samples are placed.

When the duration of video data and the duration of audio data recorded as the above-described successive record length are not fixed, the successive record length is described in the movie resource portion of the QuickTime movie file. The successive record length is described as for example the number of frames of one video chunk and the number of samples of one audio chunk. In addition, information that represents that two or more different types of data such as video data and audio data have been successively recorded is stored in the file. In the above-described example, sets of an audio chunk and a video chunk are successively recorded. In the case of QuickTime, information that represents a set of tracks is described in user-defined data atom. The user-defined data atom is described in a hierarchy of the header portion 50 or the track portion 51 shown in FIG. 2.

Figure 10:
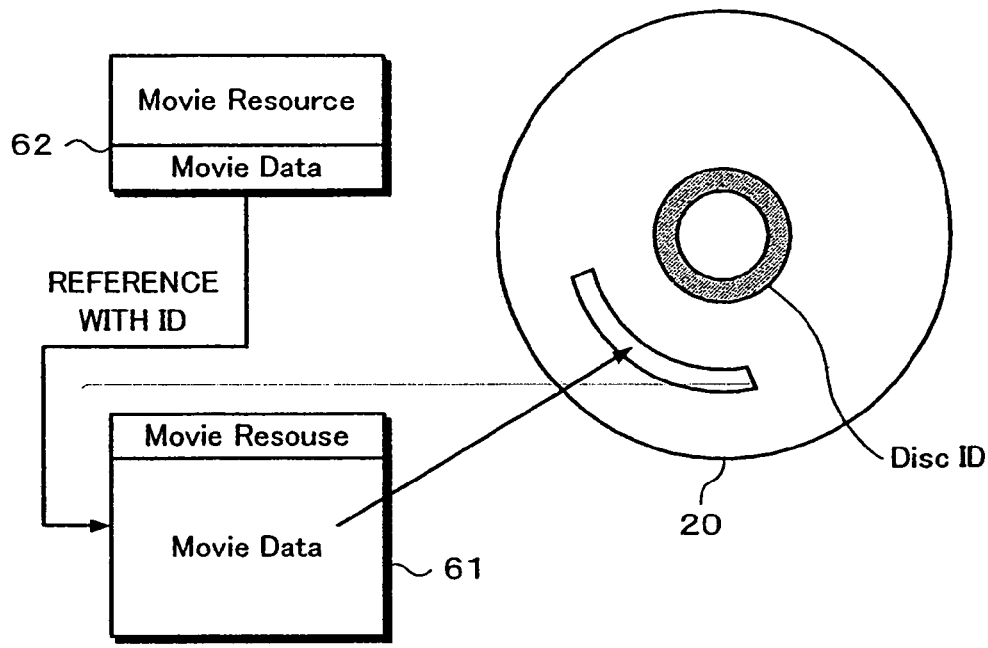
FIG. 10 is a schematic diagram for explaining a concept of the present invention.

According to the present invention, as with the above-described QuickTime, a file in a structure that allows an external-referenced type file that contains only a resource portion to exist is edited on a personal computer. When the edited result is copied or moved to an optical disc in the external-referenced type file format, a problem of which the same identification information takes place is solved. FIG. 10 shows a concept of the present invention. On the optical disc 20, a unique disc ID has been recorded. A movie file 61 has been recorded in a self-contained type file format on the optical disc 20.

When a file 62 containing only a movie resource portion references the movie file 61 corresponding to the reference file information, the disc ID is used. In other words, the resource portion of the file 62 contains the disc ID (or a unique character string converted from the disc ID as was described above). When the file is stored, the disc ID is obtained. The disc ID of the resource portion is compared with the disc ID that is read from the optical disc 20. When they match, it is determined that the file 62 is a file referenced by the movie file 61. When they do not match, it is determined that the file 62 is not a file referenced by the movie file 61. A relevant alarm is issued.

Figure 11:
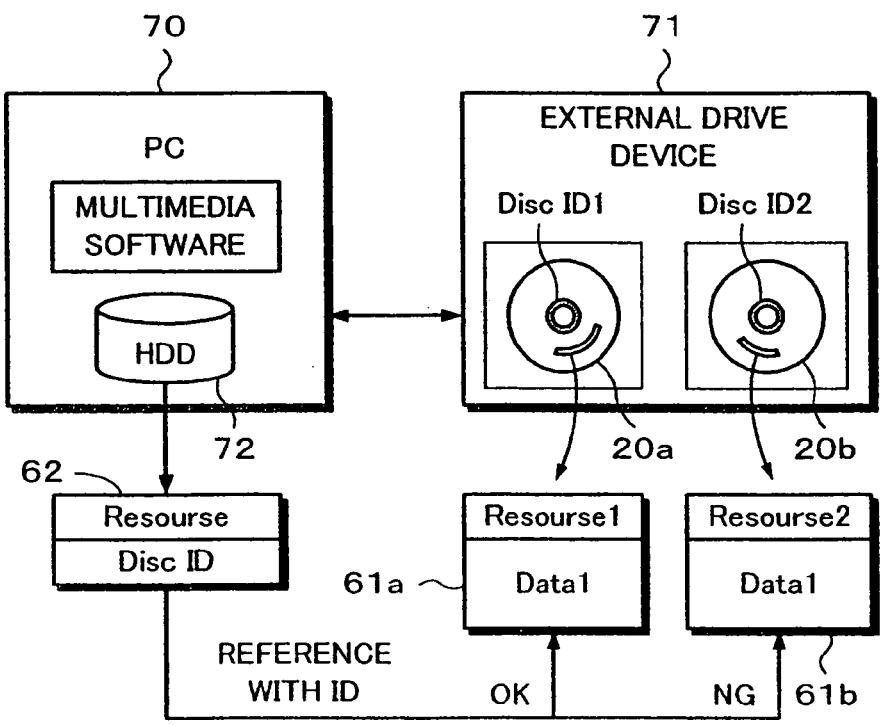
FIG. 11 is a schematic diagram for explaining an editing system according to the present invention.

FIG. 11 shows a system that performs an editing process according to the present invention. In FIG. 11, reference numeral 71 represents an external optical disc drive device (or a recorder such as a disc recording and reproducing apparatus having a built-in Camera). The external drive device 71 is connected to a personal computer 70. For example, an optical disc 20*a* is inserted into the external drive device 71. A plurality of files recorded on the optical disc 20*a* are copied or moved to a hard disk 72 of the personal computer 70. Real data (movie data) of files is not read to the personal computer 70. Instead, only reference information (movie resource portion) is read to the personal computer 70.

Multimedia software such as QuickTime is pre-installed to the personal computer 70. The user performs an editing operation using the software and copies or moves the edited result to the optical disc. The edited result is recorded in an external-referenced type file format to the optical disc. When the edited result is stored, the disc ID of the optical disc 20*a* having a file to be referenced is written to the reference information storing portion of the external-referenced type file.

The edited result may be mistakenly restored to another optical disc 20*b* instead of the original optical disc 20*a*. In addition, the edited result may be stored in the personal computer 70. The personal computer 70 may reproduce a program using a file recorded on an optical disc. In this case, the original optical disc 20*a* may be replaced with another optical disc 20*b*.

When a recorder or the personal computer 70 reproduce data from an optical disc on which the edited result has been recorded, the recorder or the personal computer 70 checks for the optical disc with a disc ID. In other words, it is determined whether or not the disc ID stored in the file 62 as the edited result matches the disc ID that is read from the disc. When the disc is the original disc 20*a*, they match. Thus, data reproduction is permitted. In contrast, when the disc is another optical disc 20*b*, since both disc IDs do not match, data reproduction is prohibited. In this case, a relevant alarm is issued. In such a manner, a problem of which the same file name (reference file information) exists in files stored in the optical discs 20*a* and 20*b*, the edited result causes such files to be referenced, and data is reproduced from such an unintended file can be prevented.

Figure 12:
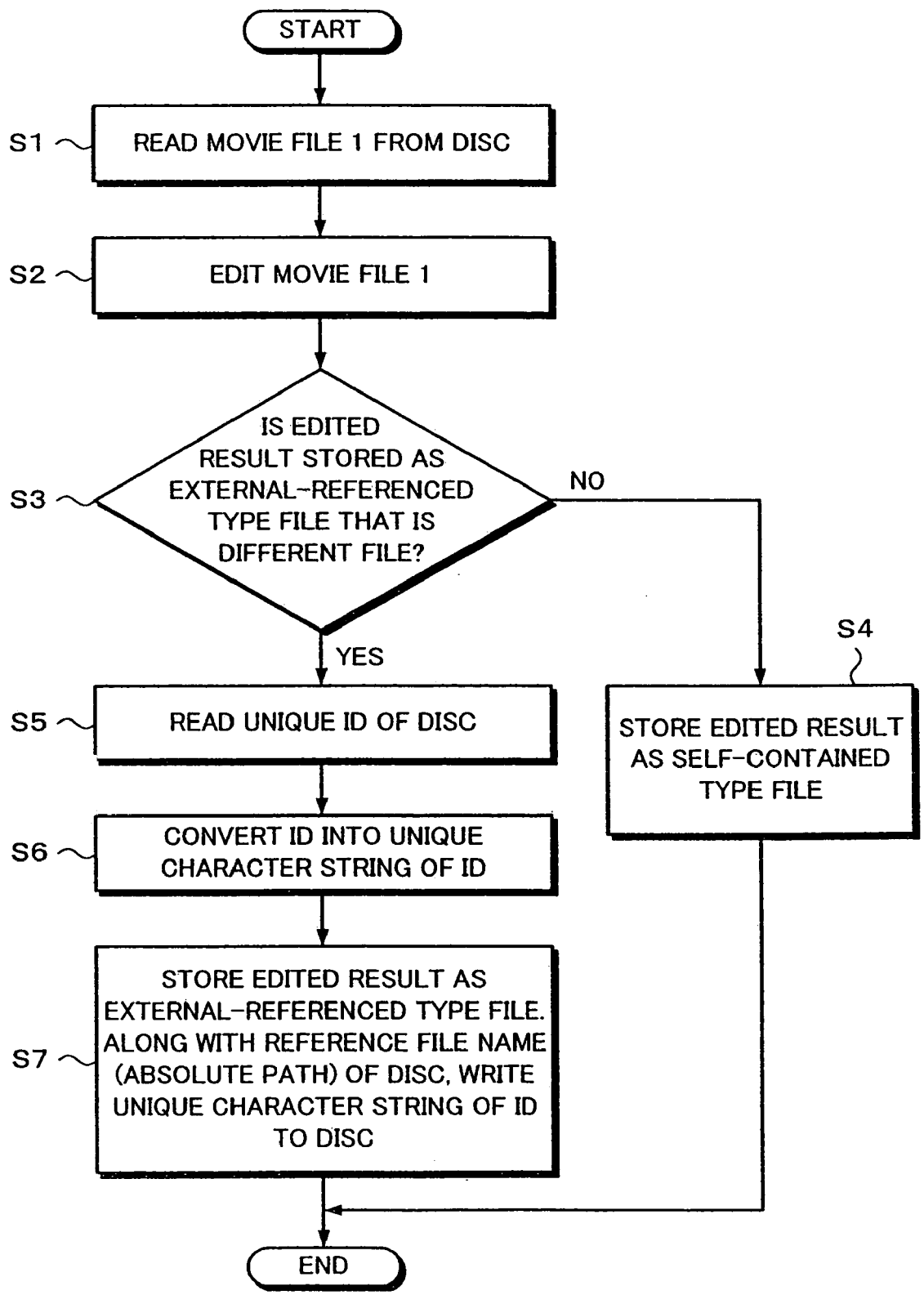
FIG. 12 is a flow chart for explaining a process upon storing a file according to the embodiment of the present invention.

FIG. 12 is a flow chart showing a process for storing a file performed by the personal computer 70 in the editing system shown in FIG. 11. At step S1, a movie file 1 is read from a disc. At step S2, the movie file 1 is edited. For example, the movie file 1 is divided into two files.

At step S3, it is determined whether or not the edited result is stored as an external-referenced type file as a different file. When the determined result at step S3 is No, the flow advances to step S4. At step S4, the edited result is stored as a self-contained type file. Thereafter, the process is completed. When the determined result at step S3 is Yes (namely, the edited result is stored as an external-referenced type file), a unique disc ID of a disc to which the file is stored is read (at step S5).

At step S6, the disc ID that has been read is converted into an unique character string of the ID. Since the disc ID is often used for copyright protection, it is not preferable to allow the disc ID—for example—a serial number to be read to the outside of the personal computer or the recorder from a view point of security. Thus, the disc ID is converted into a different character string. Alternatively, the disc ID may be encrypted.

At step S7, the edited result is stored as an external-referenced type file. In other words, in addition to the reference file name (absolute path), a unique character string of the ID is written to the external-referenced type file. Thereafter, the process is completed.

Next, with reference to a flow chart shown in FIG. 13, a process for reproducing a stored file will be described. The process shown in FIG. 13 is performed by an external drive device, the personal computer 70 to which a recorder is connected, or a recorder. At step S21, the movie file 1 to be reproduced is read from the disc. Thereafter, it is determined whether or not the movie file 1 is an external-referenced type file (at step S22).

When the movie file 1 is a self-contained type file the flow advances to step S23. At step S23, the movie file 1 is reproduced as a self-contained type file. Thereafter, the process is completed. When the determined result at step S22 is Yes (namely, the movie file 1 is an external-referenced type file), the flow advances to step S24. At step S24, the reference file name (absolute path) and the unique character string 1 of the ID are read from the movie file 1.

Thereafter, the flow advances to step S25. At step S25, the unique ID is read from the disc. Thereafter, the flow advances to step S26. At step S26, the ID is converted into a unique character string 2 of the ID. Thereafter, the flow advances to step S27. At step S27, it is determined whether or not the unique character string 1 of the ID that has been read from the movie file 1 matches the unique character string 2 of the ID that has been read from the disc. When they do not match, the flow advances to step S30. At step S30, the user is informed of a message that represents that the disk does not store the file to be referenced. Thereafter, the process is completed.

When the determined result at step S27 is Yes (namely, the character string 1 matches the character string 2), the flow advances to step S28. At step S28, a file to be referenced is read from the disc. The movie file 1 is reproduced with the reference file stored on the disc. Thereafter, the process is completed.

Figure 14:
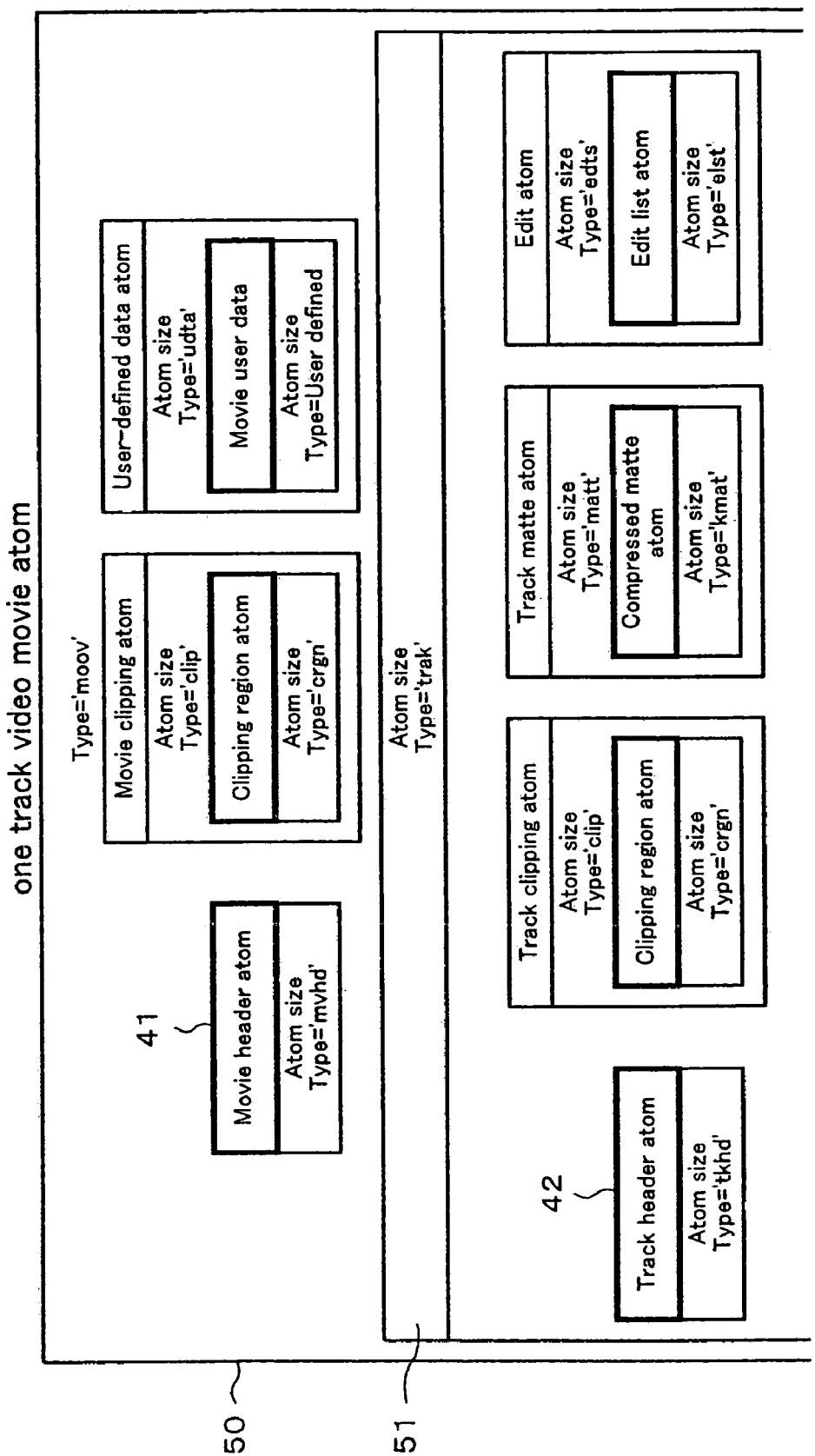
FIG. 14 is a schematic diagram for explaining the detailed data structure of the movie resource portion according to the embodiment of the present invention.
Figure 15:
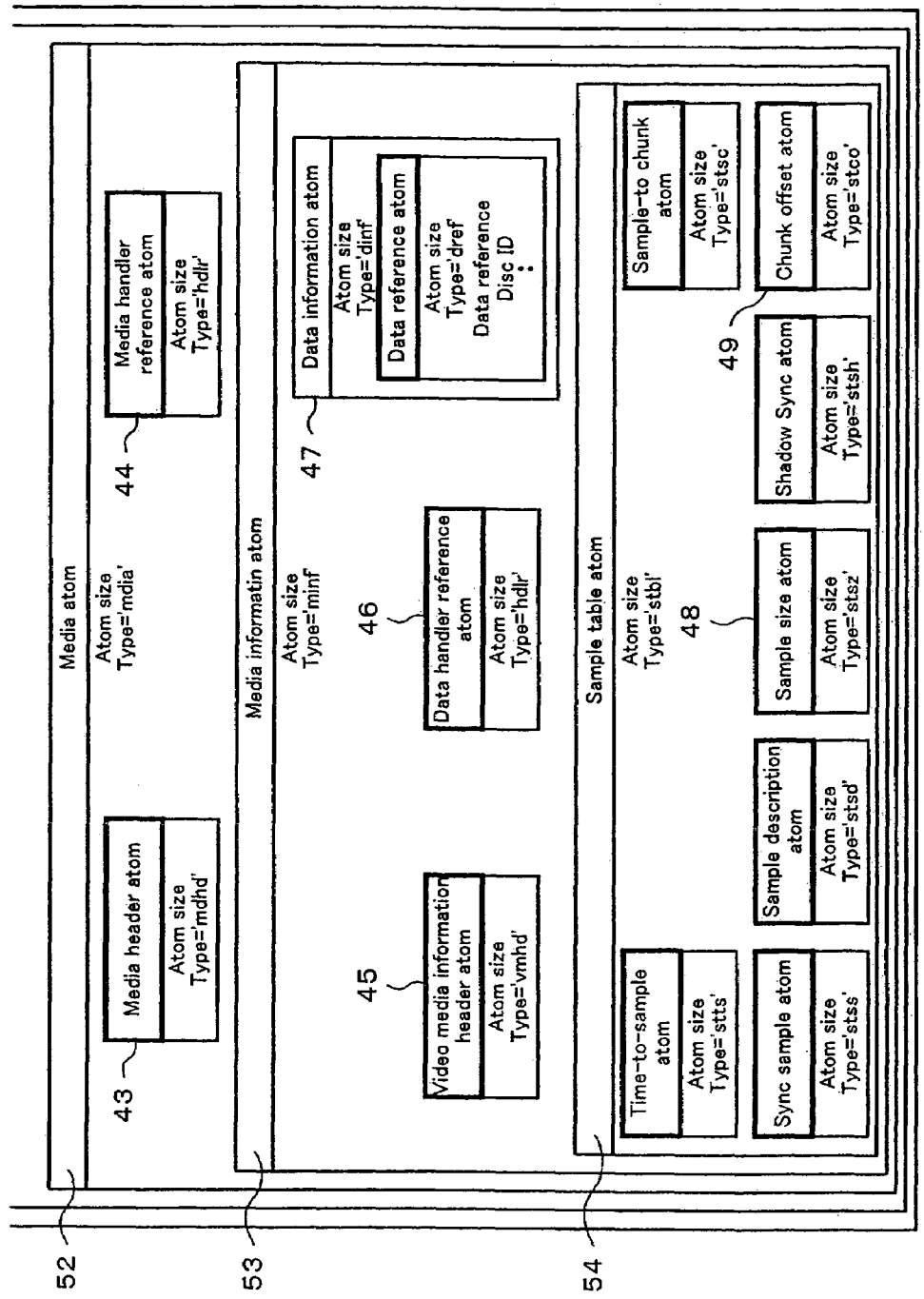
FIG. 15 is a schematic diagram for explaining the detailed data structure of the movie resource portion according to the embodiment of the present invention.
Figure 16:
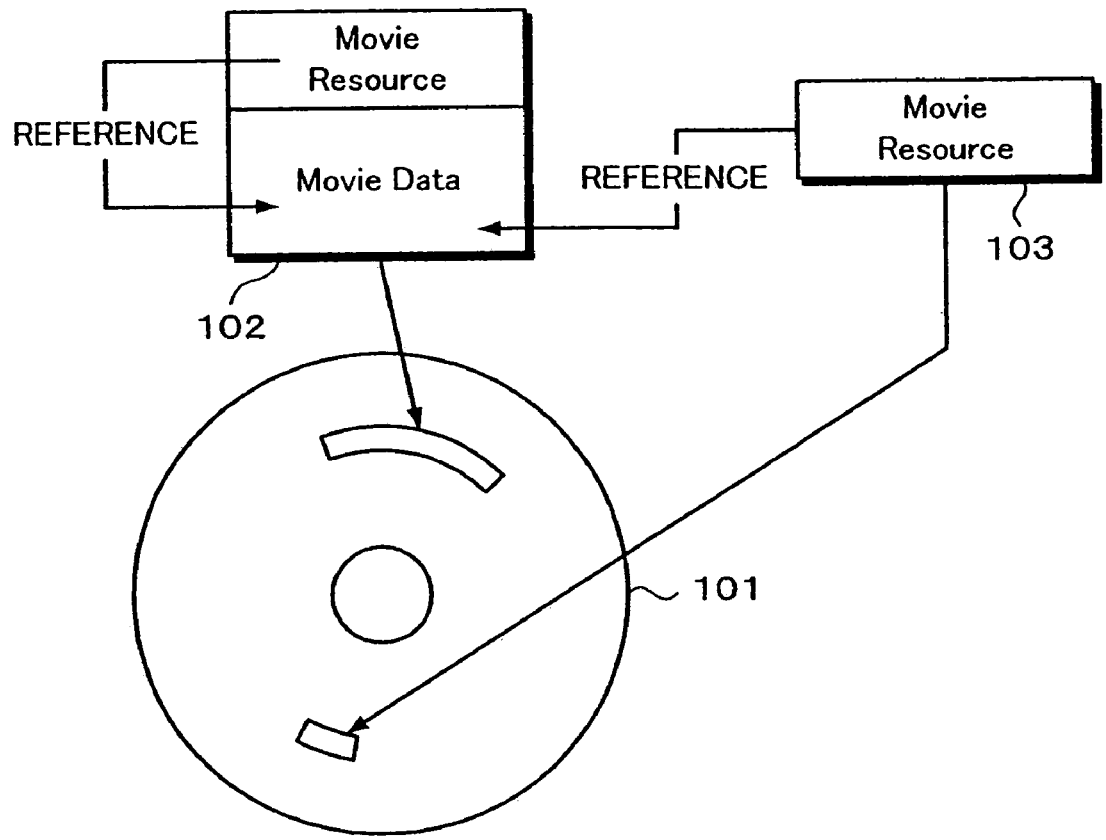
FIG. 16 is a schematic diagram for explaining an external-referenced type file.
Figure 17:
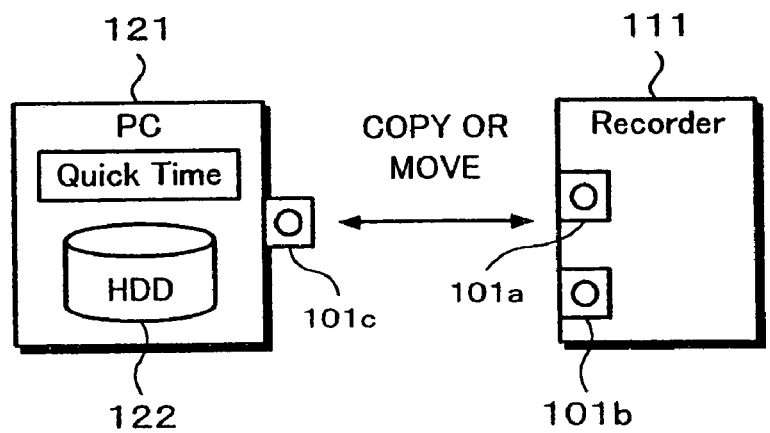
FIG. 17 is a schematic diagram for explaining a problem to be solved by the present invention.

In the example of QuickTime, the movie resource portion is a reference information storing portion. The resource portion contains reference file information and a disc ID or a character string created with the disc ID. FIGS. 14 and 15 shows the detailed data structure of the move resource portion of QuickTime. FIGS. 14 and 15 show a first portion and a second portion of the data structure of the move resource portion of QuickTime.

As was described with reference to FIG. 2, the movie resource portion has a hierarchical structure of the header portion 50, the track portion 51, the media portion 52, media information portion 53, and the sample table portion 54. The track portion 51 describes information about individual data parts of the movie data. The media portion 52 describes information about individual data parts. As was described above, the movie resource portion is used for one video track. Likewise, the audio resource portion 55 (not shown) is used for one audio track. The structure of the movie resource portion 50 is the same as the structure of the audio resource portion 55.

As shown in FIG. 15, the media information portion 53 contains a data information portion 47. The data information portion 47 contains reference file information (file name) that represents a file to be referenced. In addition to the reference file information, the disc ID (or a unique character string created with the disc ID) is written to the data information portion 47.

In the above description, the present invention is applied to a disc recording and reproducing apparatus having a built-in camera. However, it should be noted that the present invention can be applied to other apparatuses. In other words, the present invention can be applied to for example a digital still camera and a digital audio recorder/player. In addition to an optical disc as a record medium, the present invention can be applied to a memory card composed of a flash memory. The memory card has a file management area that is separated from a data file. In addition, for copyright protection, a memory card may store unique medium identification information. The present invention can be applied to such a memory card.

In addition, according to the present invention, part or all the hardware structure shown in FIG. 1 may be accomplished by software. Moreover, the software is stored in a record medium that can be read by a computer. An example of such a record medium is a CD-ROM.

In the above-mentioned embodiment, QuickTime was described. In addition, the present invention can be applied to computer software that allows a sequence of data that varies in a plurality of time sequences to be synchronously reproduced without need to use dedicated hardware.

According to the present invention, in addition to reference file information that designates a file that an external-referenced type file references, the unique medium ID of a record medium that has a file that is referenced or a description created with the medium ID are written. According to the present invention, when an external reference file is reproduced, with reference to a medium ID or a description created with the medium ID, when data is reproduced from the external reference file, it can be determined whether or not the record medium has a file to be referenced. Thus, the edited result can be prevented from designating an unintended file.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A recording method for recoding digital data to a record medium that is removable and assigned unique medium identification information, comprising the steps of:

converting data to be recorded into a file structure that allows a first file format and a second file format to be used, the first file format being handled by computer software and composed of a reference information storing portion and a real data storing portion, the second file format being composed of only a reference information storing portion; and recording data having the file structure to the record medium, wherein reference file information and medium identification information of the record medium or information of which the medium identification information has been converted are recorded to at least the reference information storing portion of a file having the second file format and wherein unintended files are prevented from being referenced during recording of data.

* * * * *